US012253042B2

(12) United States Patent
Thorn et al.

(10) Patent No.: US 12,253,042 B2
(45) Date of Patent: Mar. 18, 2025

(54) HIGH PRESSURE REGULATED FUEL RETURN APPARATUS FOR ENGINES USING DIRECT INJECTION FUEL SYSTEMS

(71) Applicant: ICOM North America LLC, New Hudson, MI (US)

(72) Inventors: Brandon Geoffrey Thorn, Fowlerville, MI (US); Albert Venezio, Walled Lake, MI (US)

(73) Assignee: ICOM North America LLC, New Hudson, MI (US)

( * ) Notice: Subject to any disclaimer, the term of this patent is extended or adjusted under 35 U.S.C. 154(b) by 0 days.

(21) Appl. No.: 18/733,025

(22) Filed: Jun. 4, 2024

(65) Prior Publication Data

US 2024/0318609 A1 Sep. 26, 2024

Related U.S. Application Data

(63) Continuation of application No. PCT/US2022/052506, filed on Dec. 12, 2022.

(60) Provisional application No. 63/288,877, filed on Dec. 13, 2021.

(51) Int. Cl.
*F02D 41/38* (2006.01)
*F02M 55/00* (2006.01)
*F02M 63/02* (2006.01)

(52) U.S. Cl.
CPC ..... *F02D 41/3845* (2013.01); *F02D 41/3863* (2013.01); *F02M 55/007* (2013.01); *F02M 63/0225* (2013.01)

(58) Field of Classification Search
CPC ............ F02D 41/3845; F02D 41/3863; F02M 55/007; F02M 63/0225
See application file for complete search history.

(56) References Cited

U.S. PATENT DOCUMENTS 4,926,829 A 5/1990 Tuckey
5,168,856 A 12/1992 Lorraine
6,142,120 A * 11/2000 Biester ................ F02D 41/3863 123/456
2003/0192509 A1 10/2003 Ishimoto
(Continued)

FOREIGN PATENT DOCUMENTS

EP 1010886 A1 6/2000
JP 09209870 A * 8/1997
JP 2003148275 A * 5/2003

OTHER PUBLICATIONS

International Search Report & Written Opinion of the International Searching Authority dated May 2, 2023 for PCT Application No. PCT/US2022/052506.

*Primary Examiner* — Mahmoud Gimie
(74) *Attorney, Agent, or Firm* — Eschweiler & Potashnik, LLC

(57) ABSTRACT

A fuel return device couples to the high pressure side of a DI fuel system. The fuel return device provides for both continuous bleeding and occasional purging of fuel from the high pressure side to prevent issues related to vapor accumulation or heat-induced pressure increase. The fuel return device may be attached to a high pressure fuel rail in place of a sensor. The sensor may be attached the fuel return device. The fuel return device may include both an orifice that throttles the fuel flow through the fuel return device and a solenoid that allows the flow rate to be increased.

18 Claims, 5 Drawing Sheets

(56) References Cited

U.S. PATENT DOCUMENTS

| | | | | |
|---|---|---|---|---|
| 2006/0211556 | A1 | 9/2006 | Sano | |
| 2010/0036585 | A1 * | 2/2010 | Scharfenberg | F02M 37/0029 123/456 |
| 2014/0123955 | A1 | 5/2014 | Kojima | |
| 2016/0230720 | A1 | 8/2016 | Hackett et al. | |
| 2017/0211505 | A1 * | 7/2017 | Anderson | F02D 41/3863 |

* cited by examiner

HIGH PRESSURE REGULATED FUEL RETURN APPARATUS FOR ENGINES USING DIRECT INJECTION FUEL SYSTEMS

REFERENCE TO RELATED APPLICATION

This Application is a Continuation of International Application PCT/US2022/052506, filed on Dec. 12, 2022, which claims the benefit of U.S. Provisional Application No. 63/288,877, filed on Dec. 13, 2021. The contents of the above-referenced Patent Applications are hereby incorporated by reference in their entirety.

FIELD

The present disclosure relates to direct injection systems for internal combustion engines.

BACKGROUND

A direct injection (DI) fuel system may include a high pressure fuel pump, high pressure fuel injectors, a high pressure fuel rail, and high pressure fuel lines. The fuel pump may provide fuel to the fuel injectors at a pressure in the range from about 100 PSI to about 4500 PSI. The fuel may be, for example, diesel, gasoline, compressed natural gas (CNG), liquid natural gas (LNG), liquid propane (LPG), dimethyl ether (DME), hydrogen ($H_2$), ammonia ($NH_3$), or the like.

SUMMARY

It is well known that fuel may vaporize in the low pressure side of a DI fuel system. For certain fuel types, engine temperatures, and modes of operation, fuel may also vaporize within the high pressure side of the DI fuel system, which is the portion of the system between the high pressure fuel pump and the fuel injectors. For example, after the engine is turned off heat from the engine may vaporize fuel that remains in the high pressure fuel rail. A check valve in the high pressure fuel pump prevents the fuel from escaping. With no outlet for the fuel, vaporization may increase pressure within the high pressure side to abnormally high levels and prevent fresh liquid fuel from being pumped in. The vapor within the high pressure fuel rail may prevent the engine from being started or cause the engine to stall.

Some aspects of the present disclosure relate to a powertrain that includes an internal combustion engine with fuel injectors, a high pressure fuel rail supplying the fuel injectors, and a fuel pump that pumps fuel from a low pressure fuel supply system into the high pressure fuel rail. A fuel return device is coupled to the high pressure side of the fuel system, which includes the high pressure fuel rail. The fuel return device includes an electronically controlled valve that regulates a fuel flow from the high pressure fuel rail to the low pressure fuel supply system.

According to a method of the present disclosure, the fuel return device is used to purge the high pressure fuel rail before starting the engine. The purge is initiated by opening the electronically controlled valve. The purge may be trigger by an early indication of engine starting such as the unlocking of a door, the opening of a door, or the insertion of a key. In some the embodiment, the purge continues for a predetermined period. In some embodiments, the purge time is determined in accordance with a fuel rail pressure and/or temperature. In some embodiments, the purge continues until a pressure in the high pressure fuel rail falls below a threshold. In some embodiments, the threshold is temperature dependent. Engine starting may be disabled until the purge is complete.

In some embodiments, the fuel return device provides for a continuous flow from the high pressure fuel rail to the low pressure fuel supply system during engine operation. The continuous flow may prevent vapor accumulation that could interfere with smooth engine operation or cause stalling. The continuous flow may reduce temperature and other variations along the length of the high pressure fuel rail and thereby increase engine efficiency. In some embodiments, the continuous flow takes place through the electronically controlled valve while the electronically controlled valve is closed. In some embodiment the electronically controlled valve is held close by a spring force. In some embodiments, the spring force is adjusted in order to regulate a rate for the continuous purge.

Fuel may enter the fuel rail at a first location and exit the fuel rail at a second location where the fuel return device is connected. A plurality of fuel injectors may be coupled to the fuel rail between the first location and the second location. In some embodiments, all of the fuel injectors that are coupled to the fuel rail are coupled to the fuel rail between the first location and the second location.

In some embodiments, the fuel return device is coupled directly to the high pressure fuel rail. In some embodiments, the fuel return device is installed on the high pressure fuel rail in place of a pressure sensor or a temperature sensor. The pressure or temperature sensor may be a combined pressure and temperature sensor. In some embodiments, the pressure or temperature sensor is reattached to the fuel return device. Alternatively, the fuel return device is welded to the high pressure fuel rail.

In some embodiments, the fuel return device includes an orifice connected in series with the electronically controlled valve. The orifice throttles a flow rate through the fuel return device when the electronically controlled valve is open so that the orifice size regulates the purge rate. In some embodiments, the orifice size is selected in relation to the size of the engine in the powertrain on which the fuel return device is installed. In some embodiments, the orifice is contained in an orifice fitting, which is a replaceable part. This allows the fuel return device to be readily adapted to engines of various sizes. If the orifice is too small, the purge time may be excessive. If the orifice is too large, the purge may be prone to an overshoot that lowers pressure in the high pressure fuel rail below a pressure at which the engine can be started.

Some aspects of the present teachings relate to a fuel return device that includes a first body that provides an inlet coupling, a second body that provides a solenoid valve and an outlet coupling, and an orifice fitting that connects the first body to the second body. The orifice fitting may be replaced to adapt the fuel return device to a different engine size. In some embodiments, the first body comprises an outlet coupling wherein the inlet and outlet couplings are structured as corresponding male and female connectors. A pressure or temperature sensor may be attached to the outlet coupling and the inlet coupling may be used to install the fuel return device in a place where the pressure or temperature sensor was previously installed.

The primary purpose of this summary has been to present broad aspects of the present disclosure in a simplified form to facilitate understanding of the present disclosure. This summary is not a comprehensive description of every aspect of the present disclosure. Other aspects of the present disclosure will be conveyed to one of ordinary skill in the art by the following detailed description together with the drawings.

DETAILED DESCRIPTION

Figure 1:
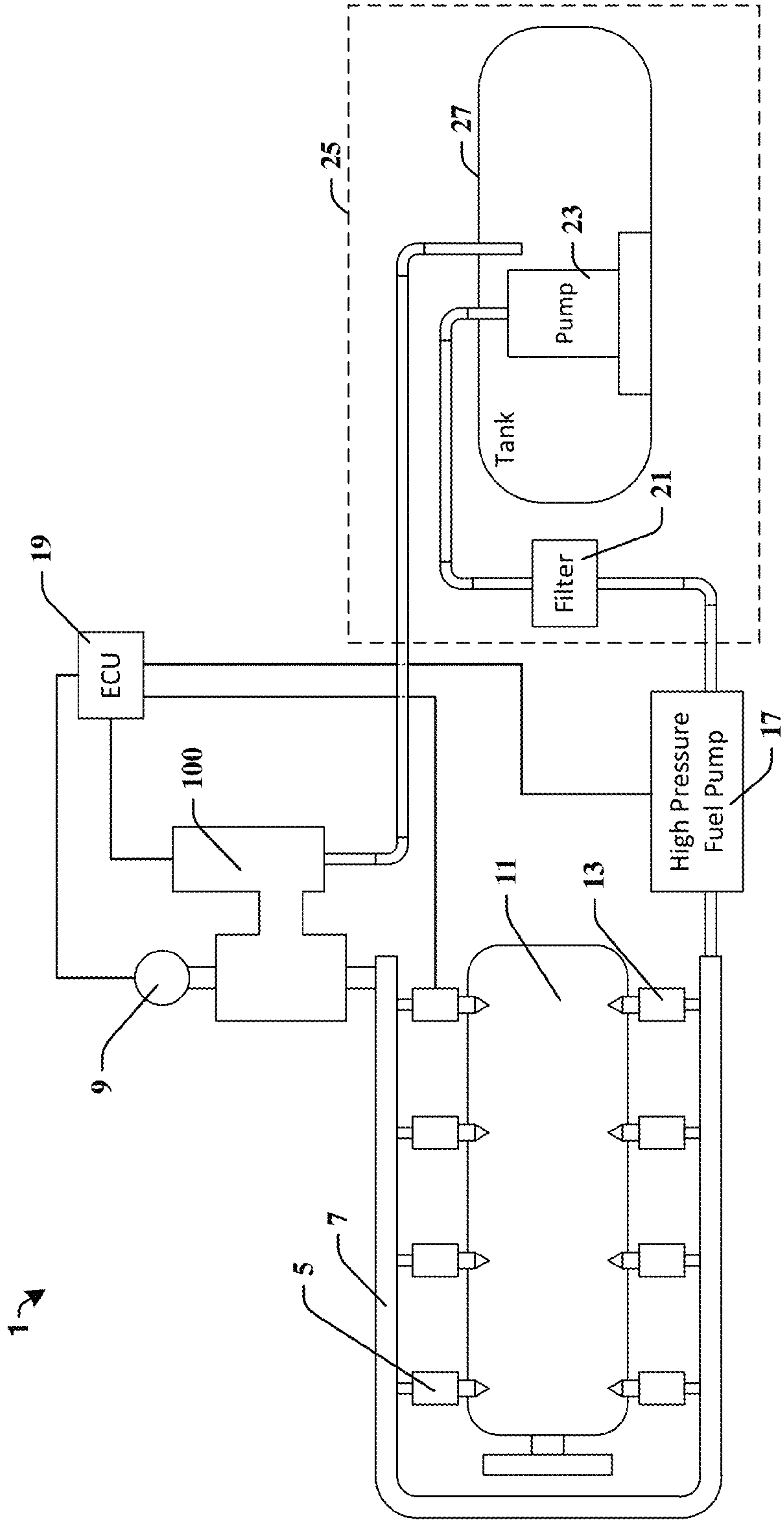
FIG. 1 illustrates a powertrain according to some embodiments of the present disclosure.

FIG. 1 illustrates a powertrain 1 according to an embodiment of the present disclosure. The powertrain 1 includes an internal combustion engine 11 and a high pressure fuel rail 7 that supplies fuel to fuel injectors 13 that inject fuel into cylinders of the internal combustion engine 11. A high pressure fuel pump 17 pumps fuel into the high pressure fuel rail 7 from a low pressure fuel supply system 25. The low pressure fuel supply system 25 may include parts such as a fuel tank 27, a low pressure fuel pump 23, a fuel filter 21, and low pressure fuel lines. The low pressure fuel supply system 25 may operate at pressures of about 100 psi or less.

A fuel return device 100 is coupled to the high pressure fuel rail 7 and to the low pressure fuel supply system 25. A pressure and temperature sensor 9 is mounted to the fuel return device 100. An electronic control unit 19 controls the fuel return device 100. In some embodiments, the electronic control unit 19 receives input from the pressure and temperature sensor 9. In some embodiments, the electronic control unit 19 controls the high pressure fuel pump 17. The electronic control unit 19 may also control the fuel injectors 13.

Figure 2:
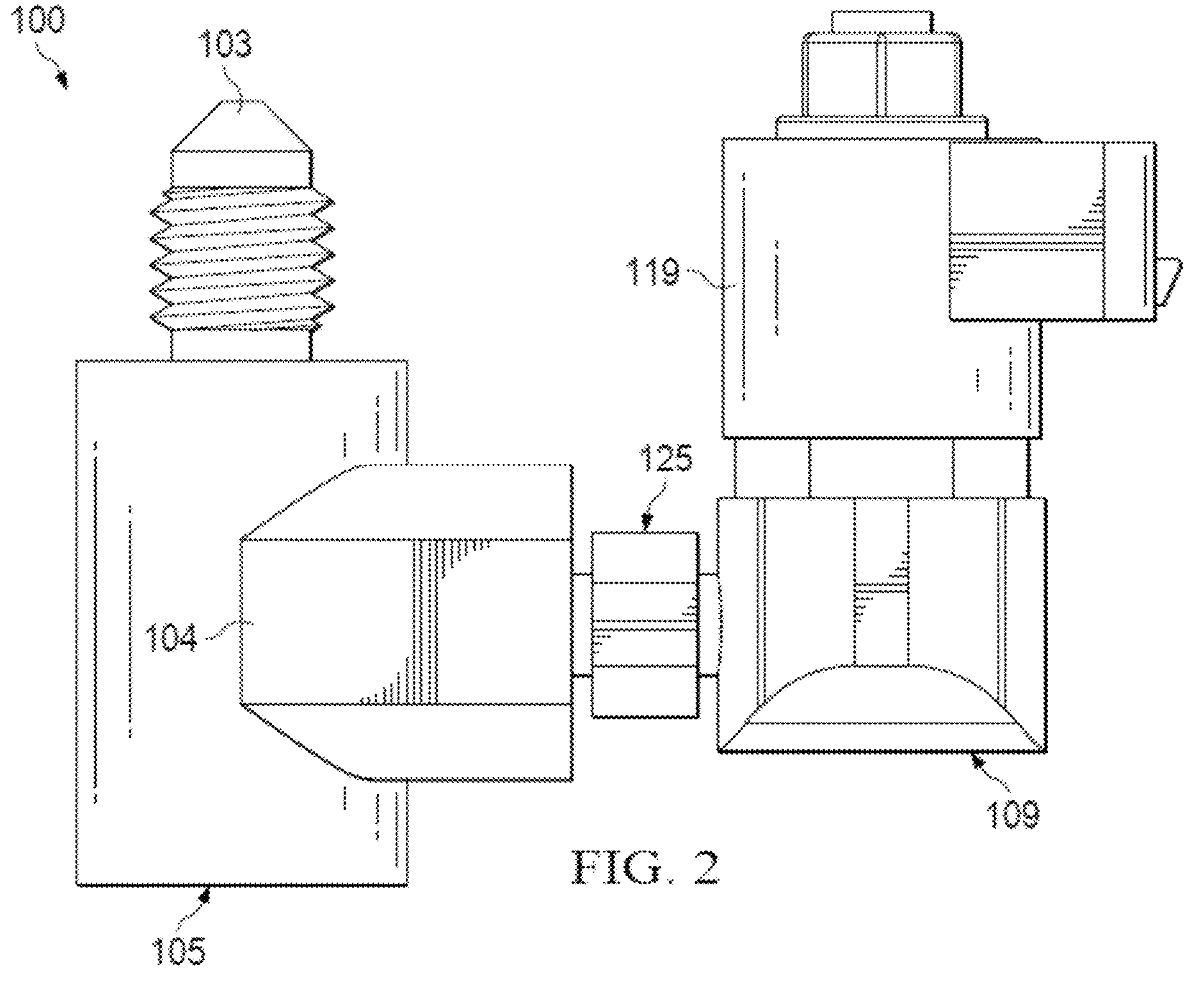
FIG. 2 provides a side view of a fuel return device according to some embodiments of the present disclosure.
Figure 3:
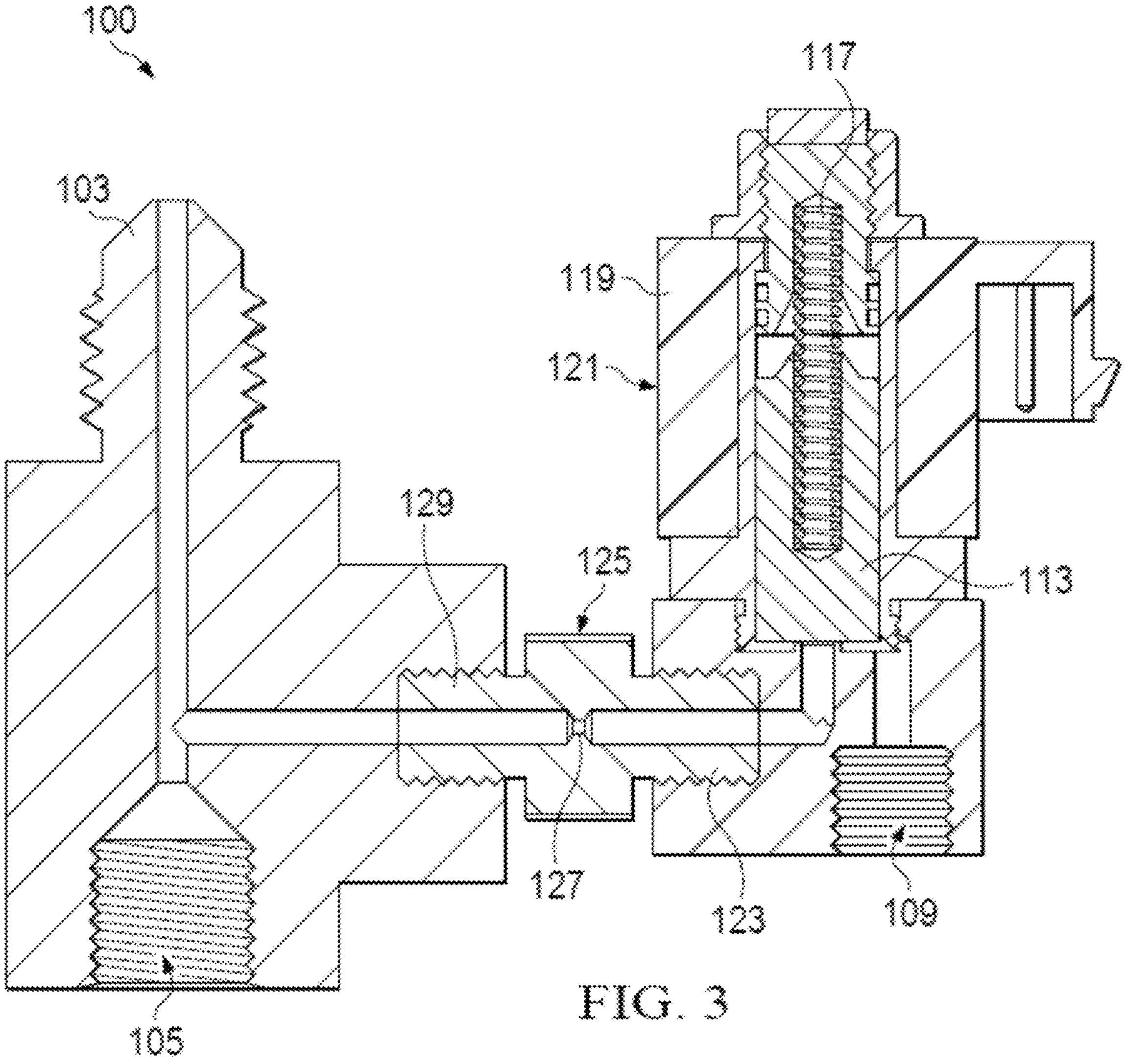
FIG. 3 provides a cut-away side view of the fuel return device of FIG. 2.
Figure 4:
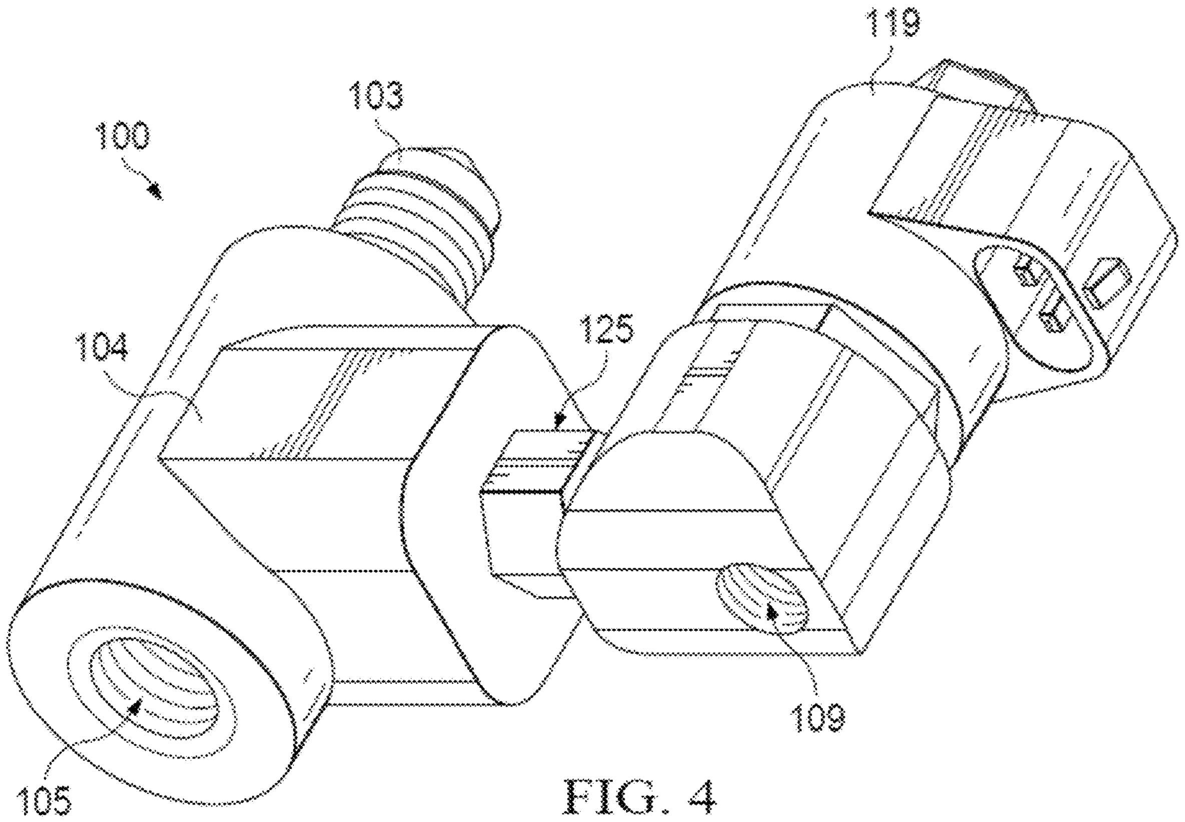
FIG. 4 provides a perspective view of the fuel return device of FIG. 2.

FIGS. 2-4 illustrate an embodiment of the fuel return device 100. The fuel return device 100 may include an inlet coupling 103 and an auxiliary coupling 105. The inlet coupling 103 is for coupling to the high pressure fuel rail 7. In some embodiments, the inlet coupling 103 has the shape of a coupling for the pressure and temperature sensor 9. In some embodiments, the auxiliary coupling 105 is complimentary to the inlet coupling 103. For example, the inlet coupling 103 may be a male coupling and the auxiliary coupling 105 may be a complementary female coupling. An original equipment manufacturer may have installed the pressure and temperature sensor 9 on the high pressure fuel rail 7. The inlet coupling 103 may have been connected in place of the pressure and temperature sensor 9 on the high pressure fuel rail 7 and the pressure and temperature sensor 9 may have been connected to the auxiliary coupling 105.

The fuel return device 100 is coupled to the low pressure fuel supply system 25 through an outlet port 109. The fuel return device 100 regulates a flow of fuel from the high pressure fuel rail 7 to the low pressure fuel supply system 25. In some embodiments, the outlet port 109 is coupled to the fuel tank 27.

An orifice fitting 125 and an electronically controlled solenoid valve 121 are disposed between the inlet coupling 103 and the outlet port 109. In some embodiments, the fuel return device 100 includes three components: a main body 104 that the includes the inlet coupling 103, the orifice fitting 125, and a second body 119 that includes the solenoid valve 121 and the outlet port 109. The orifice fitting 125 includes an orifice 127 that provides a bottle neck for flow between the inlet coupling 103 and the outlet port 109 when the solenoid valve 121 is open and the high pressure fuel rail 7 is at an operating pressure.

The orifice fitting 125 may be a replaceable part that joins the main body 104 to the second body 119. In some embodiments, the orifice fitting 125 include a first connector 129 for reversible coupling with the main body 104 and a second connector 123 for reversible coupling with the second body 119.

The solenoid valve 121 includes a coil (not shown), a plunger 113, and a spring 117. The spring 117 may be configured to bias the plunger 113 to a first plunger position. The coil may be operative to retract the plunger to open the solenoid valve 121. When the solenoid valve 121 is open, the fuel return device 100 provides a flow of fuel from the high pressure fuel rail 7 to the low pressure fuel supply system 25. The orifice 127 is the largest resistance to that flow, whereby the flow rate may be controlled by varying the size of the orifice 127.

When the coil is deenergized the solenoid valve 121 closes. The solenoid valve 121 may be configured to provide a continuous bleed from the inlet coupling 103 to the outlet port 109 while in the closed position. The volume of that flow may be continuously variable on the force the spring 117 exerts on the plunger 113 whereby the bleed rate may be controlled by adjusting tension of the spring 117. Continuously variable means that in the limit of sufficiently small changes the variation is linear.

Figure 5:
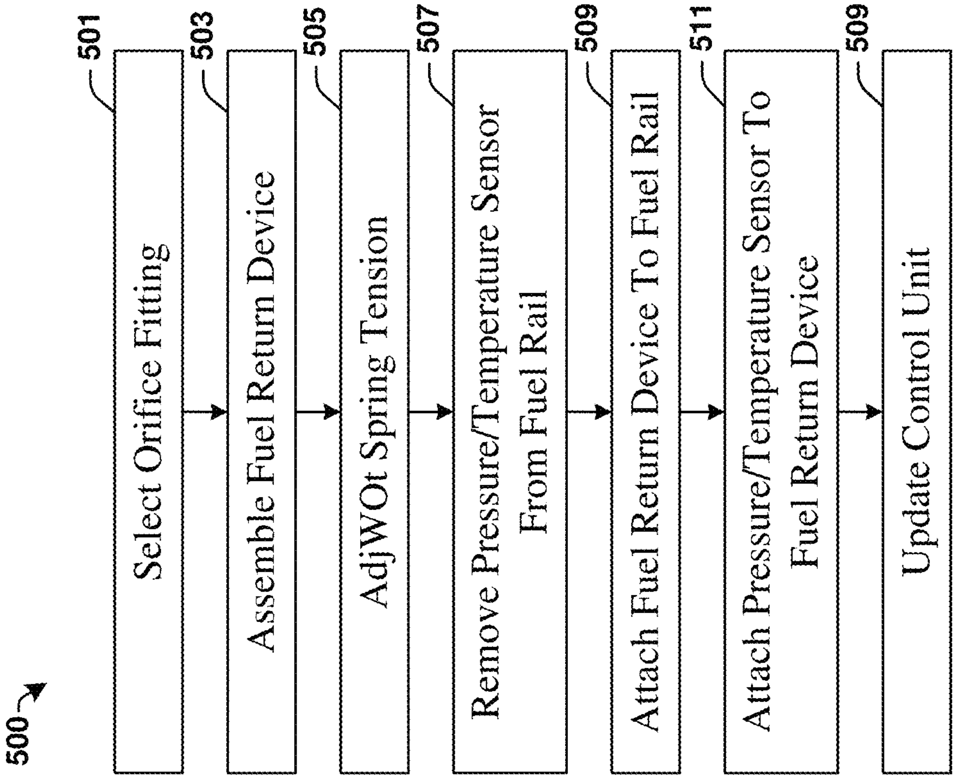
FIG. 5 provides a flow chart of a method in accordance with some embodiments for installing a fuel return device in a powertrain.

The fuel return device 100 may be used in an OEM or a retrofit application. FIG. 5 is a flow chart for a method 500 of installing the fuel return device 100 in a retrofit application. Act 501 is selecting the orifice fitting 125 to provide an orifice 127 of a suitable size. A suitable size allows a rapid purge for the high pressure fuel rail 7 that can be carried out without dropping pressure in the high pressure fuel rail 7 below a temperature at which the internal combustion engine 11 can be started.

Act 503 is assembling the fuel return device 100. Assembling the fuel 100 may comprise joining the second body 119 to the main body 104 using the orifice fitting 125 (see FIGS. 2-4).

Act 505 is adjusting the spring 117 to provide a desired bleed rate. The bleed rate is made sufficiently high to avoid vapor build-up in the high pressure fuel rail 7 (see FIG. 1) during operation of the engine 11. The bleed rate may also be made sufficiently high to ameliorate temperature variations along the length of the high pressure fuel rail 7. The bleed rate may be limited to keep the high pressure fuel pump 17 from working excessively. Adjusting the spring force may comprise adjusting a screw that biases the spring 117. Alternatively, adjusting the spring force may comprise selecting the spring 117.

Act 507 is removing a pressure or temperature sensor such as the pressure and temperature sensor 9 (see FIG. 1) from the high pressure fuel rail 7. Act 509 is installing the fuel return device 100 in place of the pressure or temperature sensor. Act 511 is reinstalling the pressure or temperature sensor on the fuel return device 100.

Act 509 is updating the electronic control unit 19 (see FIG. 1) with instructions for operating the fuel return device 100. These instructions may selectively operate the solenoid valve 121 (see FIG. 2-4) to rapidly purge the high pressure fuel rail 7. In some embodiments these instructions cause a rapid purge of the high pressure fuel rail 7 immediately prior to starting the engine 11. In some embodiments these instructions cause a rapid purge when a pressure in the high pressure fuel rail 7 exceeds a threshold. The electronic control unit 19 may be updated by replacement, augmentation, or programmed with new instructions. The installation process may also include connecting the electronic control unit 19 to the fuel return device 100.

Figure 6:
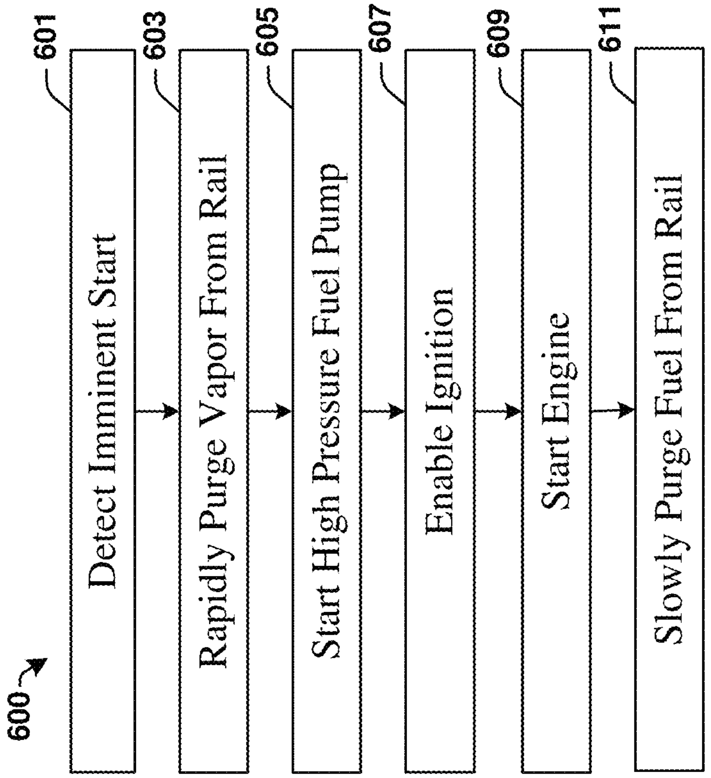
FIG. 6 provides a flow chart of a method in accordance with some embodiments for operating a fuel return device.

FIG. 6 is a flow chart of a method 600 of operating the fuel return device according to the present disclosure. The method may begin with act 601, detecting an imminent start of the engine 11. The detection may be based on a command to unlock a vehicle, the opening of a vehicle door, the insertion of a key in an ignition switch, the like, or any other suitable indication.

Act 603 is rapidly purging vapor from the high pressure fuel rail 7 by holding the solenoid valve 121 open for a period of time. In some embodiments, the period is limited so that the purge is halted before pressure in the high pressure fuel rail 7 falls below a level at which the internal combustion engine 11 can be started. The period may be predetermined. The period may be programmed into the electronic control unit 19 at the time of installing the fuel return device 100. In some embodiment, the period is determined based on measurements of pressure and/or temperature in the high pressure fuel rail 7. In some embodiments, the endpoint of the period is determined by a measurement such as a pressure in the high pressure fuel rail 7 falling below a threshold. After the purge, the solenoid valve 121 is allowed to close.

Act 605 is turning on the high pressure fuel pump 17 to prepare the engine 11 for starting. In some embodiments, the high pressure fuel pump 17 is switched on before the purge is complete. In some embodiments, the high pressure fuel pump 17 is not switched on until after the purge is complete.

Act 607 is enabling the engine 11 to start. The engine 11 may be prevented form starting until the rapid purge is complete. In some embodiments, a light is illuminated to signal an operator when the engine is ready to start or to signal the operator to wait before attempting to start the engine 11.

Act 609 is starting the engine 11. The engine 11 may be started manually by an operator. Alternatively, the engine 11 may be started automatically once ignition has been enabled.

Act 611 is slowly purging fuel from the high pressure fuel rail 7 through the fuel return device 100. This may occur passively if the fuel return device 100 is configured to return fuel while closed. Alternatively, this may occur actively by pulse width modulated operation of the solenoid valve 121.

Under some operating conditions the slow purge may be insufficient to prevent vapor from accumulating in the high pressure fuel rail 7. Accordingly, in some embodiments a rapid purge is initiated while the engine 11 is running.

The components and features of the present disclosure have been shown and/or described in terms of certain disclosure and examples. While a particular component or feature, or a broad or narrow formulation of that component or feature, may have been described in relation to only some aspects of the present disclosure or some examples, all components and features in either their broad or narrow formulations may be combined with other components or features to the extent such combinations would be recognized as logical by one of ordinary skill in the art.

The invention claimed is:

1. A powertrain, comprising:
an internal combustion engine;
fuel injectors mounted to the internal combustion engine;
a high pressure fuel rail coupled to the fuel injectors;
a low pressure fuel supply system;
a fuel pump connected between the low pressure fuel supply system and the high pressure fuel rail; and
a fuel return device coupled to the high pressure fuel rail and the low pressure fuel supply system, wherein the fuel return device comprises an electronically controlled valve that regulates a fuel flow from the high pressure fuel rail to the low pressure fuel supply system, and the fuel return device provides a continuous flow between the high pressure fuel rail and the low pressure fuel supply system when the electronically controlled valve is closed.

2. The powertrain of claim 1, wherein the continuous flow takes place through the electronically controlled valve.

3. The powertrain of claim 2, wherein:
the electronically controlled valve is a solenoid valve comprising a spring force that biases the electronically controlled valve closed; and
a rate of the continuous flow varies continuously with small changes in the spring force.

4. The powertrain of claim 1, further comprising a pressure sensor or a temperature sensor attached to the fuel return device.

5. The powertrain of claim 4, wherein:
the fuel return device has a first coupling that couples the fuel return device to the high pressure fuel rail;
the fuel return device has a second coupling that couples the fuel return device to the pressure sensor or the temperature sensor; and
the first coupling and the second coupling are corresponding male and female connectors.

6. The powertrain of claim 1, wherein the fuel return device comprises an orifice that throttles fuel flow from the high pressure fuel rail to the low pressure fuel supply system when the electronically controlled valve is open.

7. The powertrain of claim 6, wherein the orifice is in a part of the fuel return device that is replaceable independently from a first coupling to the low pressure fuel supply system, a second coupling to the high pressure fuel rail, and the electronically controlled valve.

8. The powertrain of claim 6, wherein the orifice is along a fuel path between the high pressure fuel rail and the electronically controlled valve.

9. The powertrain of claim 1, wherein:
the fuel pump is connected to the high pressure fuel rail at a first location on the high pressure fuel rail;
the fuel return device is connected to the high pressure fuel rail at a second location on the high pressure fuel rail; and
one or more of the fuel injectors are connected to the high pressure fuel rail at locations between the first location and the second location.

10. The powertrain of claim 9, wherein all of the fuel injectors that are connected to the high pressure fuel rail are connected to the high pressure fuel rail at locations between the first location and the second location.

11. A fuel return device, comprising:
a first body that provides an inlet coupling;
a second body that provides a solenoid valve and an outlet coupling; and
an orifice fitting that connects the first body to the second body; and an auxiliary coupling on the first body, wherein the auxiliary coupling and the inlet coupling are corresponding male and female connectors.

12. The fuel return device of claim 11, wherein the fuel return device provides a continuous flow between the inlet coupling and the outlet coupling when the solenoid valve is closed.

13. The fuel return device of claim 12, wherein the continuous flow takes place through the solenoid valve.

14. The fuel return device of claim 13, wherein:

the solenoid valve comprises a spring that biases the solenoid valve closed; and a rate of the continuous flow varies continuously with small changes in tension on the spring.

15. A method of installing a fuel return device in a powertrain of a type that includes a high pressure fuel rail that supplies fuel to a plurality of fuel injectors that inject the fuel into an internal combustion engine, the method comprising:

removing a temperature sensor or a pressure sensor from the high pressure fuel rail;

installing the fuel return device in place of the temperature sensor or the pressure sensor;

installing the temperature sensor or the pressure sensor on the fuel return device; and coupling an outlet of the fuel return device to a low pressure fuel supply system for the powertrain.

16. The method of claim 15, further comprising assembling the fuel return device wherein assembling the fuel return device comprises coupling a first body to a second body through a fitting that contains an orifice that throttles purging of high pressure fuel rail though the fuel return device.

17. The method of claim 15, further comprising regulating a flow between the high pressure fuel rail and the low pressure fuel supply system by adjusting tension on a spring in the fuel return device.

18. The method of claim 15, further comprising installing a controller, wherein the controller initiates a purge of the high pressure fuel rail through the fuel return device prior to starting the internal combustion engine.

* * * * *